Nov. 11, 1958    R. L. BANKS    2,860,127
START-UP OF A POLYMERIZATION PROCESS
Filed Feb. 6, 1957
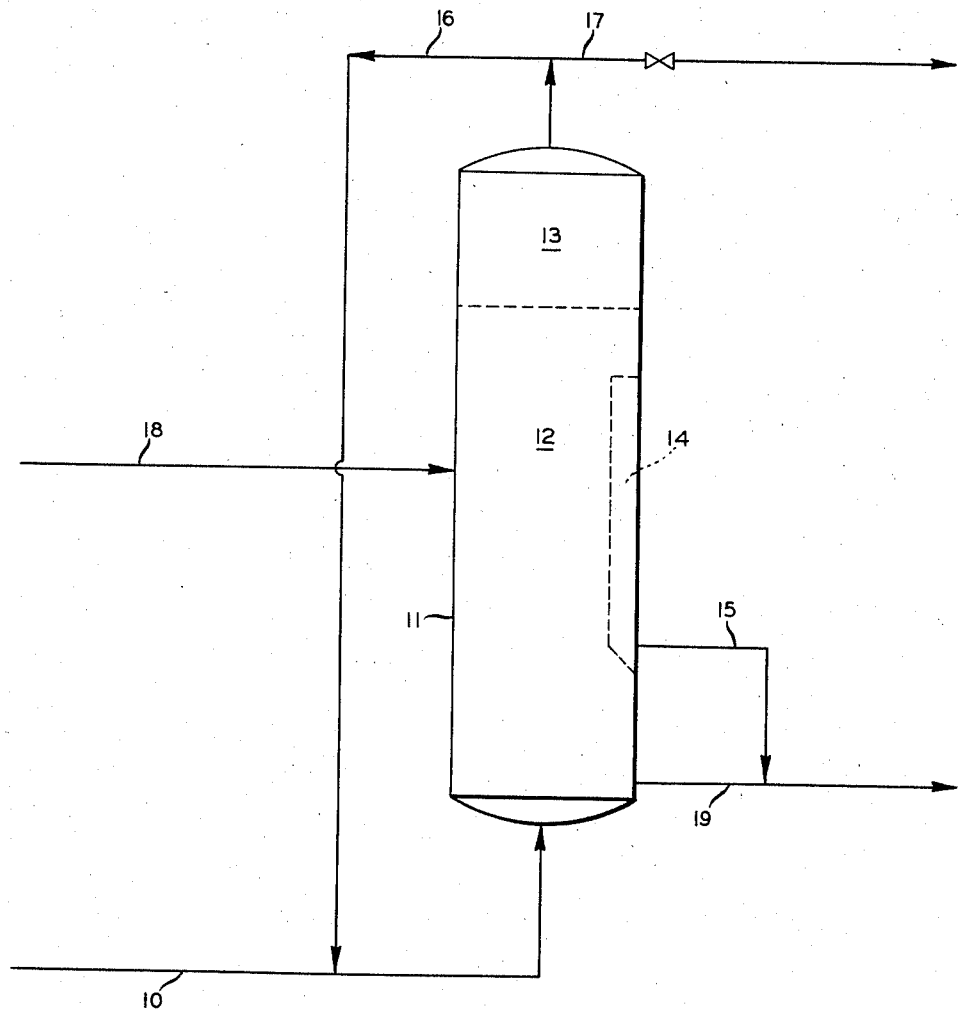
INVENTOR.
R. L. BANKS
BY *Hudson + Young*
ATTORNEYS United States Patent Office 2,860,127
Patented Nov. 11, 1958

2,860,127

START-UP OF A POLYMERIZATION PROCESS

Robert L. Banks, Bartlesville, Okla., assignor to Phillips Petroleum Company, a corporation of Delaware Application February 6, 1957, Serial No. 638,602

9 Claims. (Cl. 260—94.9)

This invention relates to a method for start-up of a polymerization reaction. In one of its aspects, this invention relates to a novel method for the start-up and operation of a gas phase fluidized catalyst bed for ethylene polymerization with a supported chromium oxide catalyst.

It has recently been discovered that certain olefins, including ethylene, can be polymerized to form normally solid polymers by contacting with a solid catalyst. Such a process is described in detail in the copending application of Hogan and Banks, Serial No. 573,877, filed March 26, 1956, now Patent No. 2,825,721 (1958). As disclosed in this application, the polymerization can be conducted in the gaseous or in the liquid phase at a temperature in the range 150 to 450° F. in the presence of a catalyst comprising chromium oxide, including a substantial amount of hexavalent chromium, associated with at least one other porous solid, especially an oxide selected from the group consisting of silica, alumina, zirconia and thoria. A preferred catalyst is one comprising 0.1 to 10 weight percent chromium as the oxide on a silica-alumina support such as 90 percent silica–10 percent alumina. This catalyst is ordinarily a highly oxidized catalyst which has been activated by high temperature, 450–1500° F., or preferably 900–1100° F., treatment under non-reducing conditions and preferably with an oxidizing gas.

Prior to my present invention, an improved process has been provided for polymerizing ethylene in gaseous phase in a fluid bed catalyst system. According to that process, a gaseous stream comprising ethylene is contacted with a comminuted solid catalyst which catalyzes the conversion of ethylene to normally solid polymers, at a linear velocity at least sufficient to move the catalyst in or through a polymerization zone maintained at a temperature sufficient to effect said conversion in the presence of said catalyst, but below the melting point of said polymer, in the absence of any substantial amount of liquid-phase material of any kind, and recovering the polymer so produced. A preferred catalyst is the supported chromium oxide catalyst of Hogan et al. having a particle size in the range of 40 to 100 mesh, although finer particles can be used, e. g., microspherical. Polyethylene prepared with such catalyst will have a melting point in the range of 240 to 260° F.

It has been found that in operating a fluidized catalyst bed to make solid polyethylene with a catalyst of supported chromium oxide that start-up at the ultimately desired pressure sometimes leads to excessive and uncontrollable initial temperature with the result that the initially formed polymer agglomerates and forms lumps, resulting in operational difficulties, unless very careful control is exercised.

It is an object of this invention to provide a method for start-up of a process for polymerizing ethylene.

It is another object of this invention to provide a process for initial operation of ethylene polymerization with a chromium oxide supported catalyst which avoids particle agglomeration.

Still other objects and advantages of this invention will be obvious to those skilled in the art having been given this disclosure.

According to this invention, an ethylene polymerization is initiated at a comparatively low pressure and is maintained at a pressure below the desired operation pressure until the catalyst particles have accumulated an amount of polymer sufficient to prevent agglomeration of the catalyst particles.

As has been said, the catalyst employed in this invention is a chromium oxide supported catalyst as described by the Hogan and Banks application. A preferred catalyst is a chromium oxide polymerization catalyst of the type described having a microspheroidal particle size, however, a particle size in the range of 40 to 100 mesh can be used, depending on available facilities for recovering or removing the fine solids from the product stream. A highly desirable catalyst is a chromium oxide catalyst associated with at least one additional oxide of the type already mentioned. A catalyst often preferred is one in which the oxide or oxides other than chromium oxide have been treated with a fluoride, e. g., a volatile fluoride, such as hydrogen fluoride, followed by heating to remove residual volatile fluoride. A further improvement can be effected by the presence of strontium oxide in the catalyst, as set forth in more detail in the copending application of Hogan and Banks, Serial No. 433,804, filed June 1, 1954, now Patent No. 2,846,425 (1958). The preferred chromium content of the chromium oxide catalyst is in the range of 0.1 to 10 weight percent and it is further preferred that at least 0.1 weight percent of the catalyst be chromium in the hexavalent state.

The polymerization to which the present invention is applicable is the polymerization of ethylene either alone or with one or more other aliphatic olefins preferably of 3 to 8 carbon atoms. I particularly prefer 1-olefins having no branching nearer the double bond than the 4-position. In general, when ethylene is copolymerized with other olefins to produce solid polymers, the ethylene will be employed in an amount of at least 85 weight percent, preferably 90 weight percent, and in any event, will be employed in an amount to insure the formation of solid polymer. Also, it is known that larger amounts of the lower molecular weight olefins can be employed than can the higher molecular weight monomers and still obtain solid polymers. Examples of suitable comonomers include propylene, 1-butene, 2-butene, 1-pentene, 2-pentene, 1-hexene, 3-hexene, 1-octene, 4-methyl-1-pentene, 4-methyl-1-hexene, 4-ethyl-1-hexene, 6-methyl-1-heptene, and the like. Also, diolefins such as butadiene, isoprene and the like can be copolymerized with the ethylene.

Polyethylene produced in the presence of a catalyst of the type above discussed has a melting point in the range of 240 to 260° F. and it is desirable that the polymerization temperature be below the melting point of the polyethylene in order to prevent agglomeration of the individual catalyst particles and the sticking of the catalyst patricles to the reactor walls. The minimum reaction temperature is ordinarily approximately 100° F., as disclosed in the cited patents of Hogan and Banks. Thus, a preferred reaction temperature is within the range of 150 to 250° F. and a further preferred temperature range is 200 to 230° F. During normal operation, the pressure employed can vary over a wide range and will depend upon activity of the catalyst, temperature, monomer concentration, and the like. However, for the purpose of the present invention a preferred range is 25 to 500 p. s. i. g.

The rate of flow of the gaseous feed stream through the reaction zone according to this invention is a flow rate which is sufficient to move the catalyst particles within or through the reaction zone. The particular rate in any given system will depend on the density and the particle size of the catalyst used and can readily be determined by routine test, by those skilled in the art. As a general rule, a linear velocity of gas in the range of 0.2 to 5 ft./sec. is satisfactory. Where it is desired to utilize the catalyst in the form of a fluidized bed, which remains, for the most part, in the reactor, a linear velocity in the range of 0.2 to 0.5 ft./sec. is satisfactory. When it is desired to us the catalyst in the form of a dilute suspension transported through the reactor zone in the gas stream, under free settling conditions, a linear velocity in the range 0.5 to 1 ft./sec. produces satisfactory results. These figures are, however, not limiting; the optimum velocity in any particular instance can readily be determined by those skilled in the art. As a general rule, a reaction time in the range of 1 second to 20 minutes is desired.

The conditions described give excellent operation without agglomeration of catalyst resulting in operational difficulties. However, it has been found in such operation that start-up at the ultimately desired pressure sometimes leads to excessive and uncontrollable initial temperature with the result that the catalyst agglomerates and forms lumps unless close control is exercised and results in difficult operation. This is true regardless of the ultimate optimum pressure which, as has been indicated, can vary from 25 to 500 p. s. i. g. or be even higher. That is for any catalyst there will be an optimum temperature and pressure for best over-all yields which can be readily determined by those skilled in the art.

I have now found that starting the operation of the process at a pressure below the maximum ultimately desired pressure results in an improved operation in that excessively high conversion per unit volume of reactor space is avoided with resultant avoidance of excessive heat release and resulting excessive temperatures. As the catalyst is used, polymer is formed at its surface and the catalyst picks up some polymer. When sufficient polymer is accumulated to keep the polymer from agglomerating, the pressure is increased to the optimum desired. In general, 15 minutes to 3 hours is sufficient to allow this build-up and preferably 30 minutes to 2 hours will be employed. Ordinarily, this final pressure will be from 1.25 to 4 times the initial pressure or the initial pressure is 0.8 to 0.25 of the optimum pressure. The final pressure can be higher than this for obviously the initial pressure need only be maintained below that at which undesirably high heat release is obtained.

If this start-up procedure is not used, the catalyst particles tend to agglomerate and it is this agglomeration which the invention is designed to prevent. While I am not limited to any theory, it is believed that the agglomeration is caused by an accumulation of static charge which is eliminated or at least minimized by polymer formation. In any case, agglomeration causes localized overheating so that some of the polymer forms at a temperature above the melting point of the polymer which further aggravates the agglomeration problem.

This start-up procedure is applicable to both batch and continuous processes. The operation of the invention can be best described with reference to the drawing which is a simplified and schematic representation of a fluidized reactor system in which the present invention can be practiced.

Referring to the drawing, ethylene feed from conduit 10 and recycle ethylene from conduit 16 are passed to reactor 11 at a low level therein. The feed contacts a fluidized catalyst bed 12 and passes upward therethrough. A portion of the gases form solid polymer on the catalyst while the unreacted gases rise to catalyst-free zone 13 and are removed and recycled via conduits 16 and 10. Since the ethylene entering the reactor contains small amounts of inerts, particularly ethane, a portion of the recycle gas is bled to ethylene purification zone, not shown, via conduit 17. Conduit 18 is provided to add catalyst to the reactor. Conduit 19 is provided to remove polymer and catalyst from the reactor in case of batch operation and standpipe 14 and conduit 15 are provided to remove polymer and catalyst in case of continuous operation.

In the case of a batch operation, the polyethylene is allowed to build up on the catalyst to the desired extent and the catalyst then removed from the reactor via conduit 19 for recovery of the polymer from the catalyst. In some instances, for example, where the catalyst is to be used for pipe or similar uses, it may be unnecessary to remove the catalyst from the polymer and the polymer containing the catalyst may be used directly.

This invention is practiced in the case of a batch-type reaction by starting the reaction at a relatively low pressure and continuing at this pressure for a time in the ranges of fifteen minutes to three hours, usually one half to two hours, and then raising the pressure to that at which the reaction will be carried out to completion. Alternatively, the reaction may be initiated at a relatively low pressure and then gradually raised to the ultimate operating pressure over a period of time, with the final operating pressure being utilized subsequently. In this latter method, care must be exercised to avoid getting into a pressure range in which excessive heat generation is encountered. Obviously, the intermediate of these two methods, multiple step raising of pressure, may also be practiced with entire satisfaction.

The fluidized catalyst technique may also be practiced in a continuous manner, the initial start-up of the operation utilizing the low pressure operation followed by continued operation at elevated pressure, as above described. In this system, fresh catalyst may be added after full pressure has been achieved by addition through line 18, with product withdrawal effected by settling in standpipe 14 and removal through line 15 to a product recovery system, not shown. By operating in this manner, the advantage of this invention is utilized in the most critical period in which high concentration of the active fresh catalyst is present within the reactor.

Full advantage of the teachings of this invention may be accomplished in the continuous fluidized operation by using multiple fluidized reactors with the initial conversion effected by the catalyst in a relatively low pressure reactor, and the final portion of the conversion carried out in a second reactor at relatively higher pressure. In this method, the initial reaction is carried out at low pressure so that temperature is readily controllable and the final reaction carried out at the more suitable higher pressure. Transfer of the catalyst from the reactor of low pressure to the reactor of high pressure can be effected by conducting the effluent of the low pressure reactor to a pressure surge tank, subsequently pressurizing the surge tank with an inert gas such as ethane, and then using this surge tank as a feed tank to the higher pressure reactor. In operating this way, two or more tanks are necessary to effect continuous operation of both reactors.

This method of operation may be practiced with a single reactor and a single surge tank by operating the reactor at low pressure until the surge tank is filled, then raising the pressure in the reactor until the higher pressure of operation is reached and charging from the surge tank back to the reactor for a second pass through and passing the product to other storage or to a processing system.

*Example*

Two runs were made to illustrate the advantage of the present invention. In both of these runs ethylene feed was passed through a fluid bed comprising a chromium oxide on silica-alumina catalyst as prepared and activated by the method of Hogan et al. That is, the catalyst consisted of 1.7 percent chromium as the oxide on a 90/10 silica-alumina support and which had been activated by heating at 1100° F. for a period of 5 hours. The catalyst was microspherical in size and shape. The gas rate was about 0.3 ft./sec. average for each run. Fresh catalyst was used in each run. In the first run using 2.2 grams of the above catalyst, the initial pressure was 450 p. s. i. g. and the temperature got out of control necessitating the lowering the pressure from the 450 p. s. i. g. to 300 to 350 p. s. i. g. Lumps of polymer were formed due to the high temperature. The yield was 33.2 grams of polymer of which 11.5 was a lump which stuck to a thermowell. This was a yield of 15.1 grams/gram of catalyst or 7.6 g./g./hr.

In the second run using 2.4 grams of the same catalyst the initial pressure of 260 p. s. i. g. and raising the pressure as follows:

10 minutes to 260 p. s. i. g.
15 minutes to 305 p. s. i. g.
15 minutes to 315 p. s. i. g.
15 minutes to 330 p. s. i. g.
15 minutes to 340 p. s. i. g.
10 minutes to 450 p. s. i. g.

During the next 5 hours the pressure varied from 440 to 460 p. s. i. g after which the run was stopped. The total yield was 187 grams of polymer without any lumps which is a yield of 77.9 grams per gram of catalyst or 13.0 g./g./hr.

Several other runs have been made using catalyst of similar activation wherein the initial pressure is held for 1 hour after which the pressure is raised to the desired operating pressure. In all of these runs no trouble has been had with hot spots or lump formation.

From the above runs, it is seen that not only can the reactor temperature be controlled, but also increased yields are obtained and the polymer formed is free of agglomerates or lumps.

This invention has been described in a preferred embodiment, however, it should not be limited thereto. Variations and modifications within the disclosure and claims can be made by those skilled in the art.

I claim:

1. In a process for polymerizing ethylene in fluidized catalyst system with a chromium oxide supported catalyst having a high initial activity, the method of modifying such initial activity which comprises contacting said catalyst at a temperature below the melting point of the polymer being formed with ethylene at a pressure not greater than 0.8 the optimum polymerization pressure until said catalyst accumulates sufficient polymer to prevent agglomeration of said catalyst.

2. In a process for polymerizing ethylene in gaseous phase with a chromium oxide supported catalyst having a high initial activity, the method of modifying such initial activity which comprises contacting said catalyst at a temperature of not more than 250° F. with aliphatic olefin monomers and comprising at least 85 weight percent ethylene at a pressure within the range of 0.25 to 0.8 of the optimum polymerization pressure for a period of time in the range of 15 minutes to three hours.

3. In a process for polymerizing ethylene in gaseous phase with a chromium oxide catalyst having a high initial activity, the method of modifying such initial activity which comprises contacting said catalyst at a temperature in the range of 150 to 250° F. with olefin monomers of 2 to 8 carbon atoms per molecule and comprising at least 85 weight percent ethylene at a gas velocity in the range of 0.2 to 5 feet per second at a pressure within the range of 0.25 to 0.8 of the optimum polymerization pressure for a period of time in the range of 15 minutes to three hours.

4. A method for polymerizing 1-olefin monomers which comprises contacting 1-olefin monomers containing 2 to 8 carbon atoms per molecule and no branching nearer the double bond than the 4-position and at least 85 weight percent ethylene with 0.1 to 5 weight percent catalyst consisting of 0.1 to 10 weight percent chromium as the oxide associated with a porous oxide selected from the group consisting of silica, alumina, thoria and zirconia, at a linear velocity within the range of 0.2 to 5 feet per second, at a temperature in the range of 150 to 250° F., at a pressure in the range of 0.25 to 0.8 of the optimum pressure, for a period of time in the range of 15 minutes to 3 hours and thereafter raising the pressure to said optimum pressure within the range of 25 to 500 p. s. i. g.

5. A method of polymerizing 1-olefin monomers which comprises contacting 1-olefin monomers containing 2 to 8 carbon atoms per molecule and no branching nearer the double bond than the 4-position and at least 90 weight percent ethylene with 0.1 to 5 weight percent catalyst consisting of 0.1 to 10 weight percent chromium as the oxide associated with a porous oxide selected from the group consisting of silica, alumina, thoria and zirconia at a linear velocity in the range of 0.2 to 5 feet per second, at a temperature in the range of 200 to 230° F., at a pressure in the range of 0.25 to 0.8 of the optimum pressure and for a period of time in the range of 30 minutes to 2 hours and thereafter raising the pressure to said optimum pressure in the range of 25 to 500 p. s. i. g.

6. The method of claim 5 wherein the said contacting of catalyst is in a fluid bed zone and the linear velocity is in the range of 0.2 to 0.5 feet per second.

7. The method of claim 6 wherein the 1-olefin is ethylene.

8. The method of claim 5 wherein the said contacting of catalyst is in a suspension system and the linear velocity is in the range of 0.5 to 1 foot per second.

9. The method of claim 8 wherein said 1-olefin is ethylene.

References Cited in the file of this patent

UNITED STATES PATENTS 2,691,647     Field et al.  ---------- Oct. 12, 1954
2,692,261     Peters et al.  ---------- Oct. 19, 1954